June 10, 1924. 1,497,497
J. GAPP
SUPERHEATER TUBE CONNECTION
Filed Sept. 13 1921
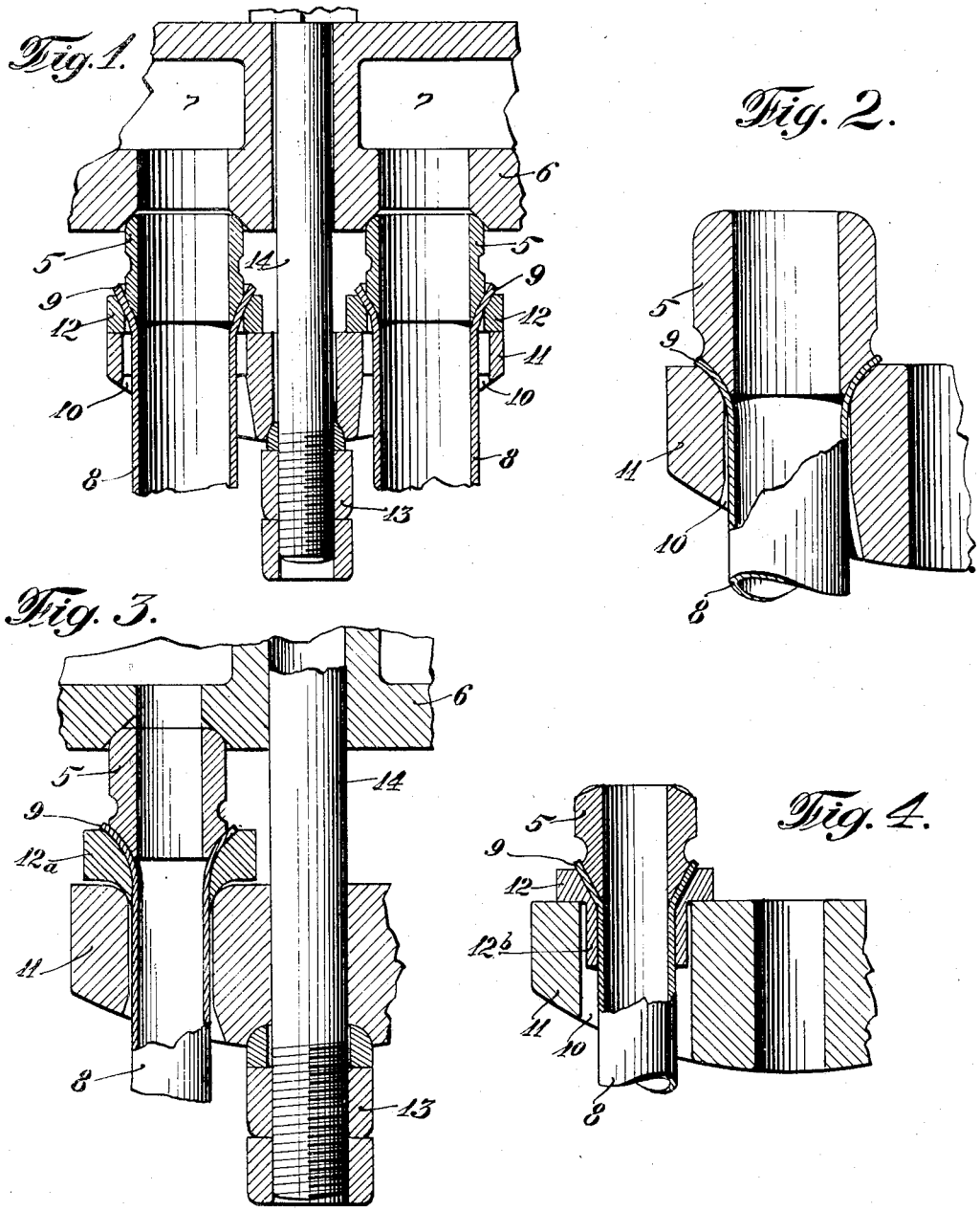
Inventor
John Gapp
By Attorney
Edward A. Wright Patented June 10, 1924.

1,497,497

UNITED STATES PATENT OFFICE.

JOHN GAPP, OF SCRANTON, PENNSYLVANIA.

SUPERHEATER-TUBE CONNECTION.

Application filed September 23, 1921. Serial No. 500,378.

*To all whom it may concern:*

Be it known that I, JOHN GAPP, a citizen of the United States, residing at Scranton, in the county of Lackawanna and State of Pennsylvania, have invented a certain new and useful Improvement in Superheater-Tube Connections, of which improvement the following is a specification.

This invention relates to connections between headers and tubes, and is particularly adapted for securing the tubular elements or units of a superheater to the header.

According to the usual practice, the units of these superheaters, and especially those applied to fire tube boilers, are attached to their headers in pairs by means of a clamping bar or flange, which is drawn toward the header by means of a bolt secured to the header and passing through the middle of the flange. The two ends of the tubular unit extend through holes at opposite ends of the flange, and are provided with enlarged heads which are tightly held between the flange and the header.

It has been found that superheater units are very liable to break off at the neck of the pipe, just below the enlarged heads, and with this prior construction, the practice has been to repair the same by welding the ends of the broken tubes to the portions having the enlarged heads. This practice, however, is not very satisfactory, as the pipes again break off at the welded point within a short time, and it becomes necessary to remove the old unit and apply a new one, which is a matter of considerable expense, as it necessitates the engine being taken out of service and brought into the shop for this purpose.

According to my improvement, the superheater unit pipes, instead of being provided with enlarged integral heads, are flared or belled out at their ends, and a nipple joint having a seat to engage the header and a tapered lower end, is inserted in the belled mouth of each pipe or tube, the flared end of each tube being seated in an outside ring supported upon the clamp or flange. With this improved construction, if a superheater unit is broken off at the neck of the pipe, the tubing may then be cut at the point of fracture, the ends being belled or flared out as before; the nipple joints are then again inserted into the ends of the tubes which are clamped and welded as before, thus producing a new joint practically as good as the first. This operation is very easily performed, and the useful life of the superheater is thereby increased many years.

In the accompanying drawings: Figure 1 is a central vertical section, through a connection between a pair of tubes of a superheater unit and the header, and embodying my improvement; Fig. 2, a section showing a modification; and Figs. 3 and 4, similar sections showing other modifications.

According to the construction shown in Fig. 1, I provide a pair of nipples, 5, having rounded upper ends adapted to seat in the openings of the header, 6, and communicate with the usual steam chambers, 7. The ends of the superheater tubes, 8, are flared or belled at 9, and extend through openings, 10, in the opposite ends of the clamping bar or flange, 11. The rings, 12, slidingly mounted on the flange, 11, are provided with flaring openings forming seats for supporting the ends of the tubes, 8, and the nipples, 5, which are tapered at their lower ends extend into the flared ends, 9, and make a tight joint therewith when the nuts, 13, of the bolt, 14, are screwed up for clamping the parts together in operative position. If desired, the end of the flared tube, 9, may then be welded to the nipple, 5, above the supporting ring, and a perfectly tight joint is obtained.

With this improved construction, it will be seen that if the tubes should break off below the flared ends, the same may be readily repaired by simply trimming off the end of the tube at the point of facture, again flaring the end of the tube, and replacing the same in position. The tapered ends of the nipples may also be reground whenever necessary in repairing a joint, and the useful life of the superheater unit is thereby greatly increased.

This operation may be repeated a number of times for repairing successive breakage, as the amount of pipe necessary to be cut off at each renewal is usually very small and the upright portion of the tube may be re bent in order to compensate for the short section removed and to restore the original height.

According to the modification shown in Fig. 3, the ring, 12ᵃ, having the flaring seat for supporting the belled end, 9, of the tube, is also provided with a tapered projection seated in a flared or rounded opening in the clamping bar or flange, 11. In the construction shown in Fig. 2, the separate supporting ring is dispensed with, and the flared end, 9, of the tube is supported directly in the rounded opening of the flange, 11. In the modification shown in Fig. 4, the supporting ring, 12, is provided with a sleeve, 12$^b$, extending down around the tube within the opening, 10, in the flange, 11, thus forming a guide for the tube.

Having now described my invention, what I claim as new and desire to secure by Letters Patent is:

1. Means for connecting the ends of superheater tubes to a header, comprising a clamping bar having openings through which said ends are passed, a collar surrounding each tube end above said bar, said collar being chamfered on its upper side around the hole therein and the tube end being outwardly flared to fit said chamfer, and nipples having tapered ends to fit in the flared ends of the tubes and engaging the header at their other ends.

2. Means for connecting the end of a tube to a header, comprising a clamping bar having a hole through which the tube is passed, a collar having a flared opening therein and surrounding the end of the tube, a nipple engaging the header at one end and having its other end externally beveled to correspond with the said flared opening in the collar, and means to draw said bar towards the header, whereby the end of the tube is clamped between the collar and nipple.

3. Means for connecting superheater tubes to headers, comprising a clamping bar having holes through which the tubes are passed, collars seated on said bar and having sleeve-like extensions entering said holes, the openings of said collars being countersunk on the side away from said bar and the ends of the tubes being flared to fit said countersinks, nipples having beveled ends fitting in the said flared ends of the tubes, and bolts connecting said bar and the header.

In testimony whereof I have hereunto set my hand.

JOHN GAPP